US006939102B2

(12) United States Patent
Liang

(10) Patent No.: US 6,939,102 B2

(45) Date of Patent: Sep. 6, 2005

(54) FLOW GUIDE COMPONENT WITH ENHANCED COOLING

(75) Inventor: George Liang, Palm City, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 27 days.

(21) Appl. No.: 10/671,249

(22) Filed: Sep. 25, 2003

(65) Prior Publication Data

US 2005/0069414 A1 Mar. 31, 2005

(51) Int. Cl.[7] .................................................. F01D 5/18

(52) U.S. Cl. ..................... 415/115; 415/116; 416/97 R; 416/92

(58) Field of Search ................................ 415/115, 116; 416/97 R, 92

(56) References Cited

U.S. PATENT DOCUMENTS 4,278,400 A * 7/1981 Yamarik et al. ............ 415/115
4,474,532 A * 10/1984 Pazder ........................ 416/92
4,604,031 A * 8/1986 Moss et al. ................... 416/92
4,775,296 A * 10/1988 Schwarzmann et al. .... 415/115
5,403,159 A 4/1995 Green et al.
5,536,143 A * 7/1996 Jacala et al. .............. 416/96 R
5,669,759 A * 9/1997 Beabout ................... 416/97 R
6,257,830 B1 * 7/2001 Matsuura et al. ......... 416/96 R
6,347,923 B1 * 2/2002 Semmler et al. .......... 416/97 R
6,439,848 B2 8/2002 Haehnle et al.
6,595,750 B2 7/2003 Parneix et al.

FOREIGN PATENT DOCUMENTS

EP 1 010 859 A2 6/2000

* cited by examiner

*Primary Examiner*—Edward K. Look
*Assistant Examiner*—Igor Kershteyn

(57) ABSTRACT

A cooled fluid flow component for a combustion engine which directs cooling fluid through complementary guided-flow regions to ensure effective cooling of the component tip end, without producing overcooled regions. The component includes multiple channels fluidly linked by a first turning zone. A contoured boundary member divides the turning zone into two guided-flow regions which cooperatively ensure that the tip is cooled appropriately. According to one aspect of the invention, the first guided-flow region forms a vortex that cools a region adjacent a channel-dividing partition, while the second guided flow region ensures the region adjacent the component tip is cooled appropriately. A method of cooling a internally-cooled fluid guide component is also provided.

19 Claims, 5 Drawing Sheets

FLOW GUIDE COMPONENT WITH ENHANCED COOLING

FIELD OF THE INVENTION

This invention relates generally to the field of internal to combustion engines and, more particularly, to a flow guide component that produces increased cooling effectiveness without producing reduced engine efficiency.

BACKGROUND OF THE INVENTION

Combustion engines are machines that convert chemical energy stored in fuel into mechanical energy useful for generating electricity, producing thrust, or otherwise doing work. These engines typically include several cooperative sections that contribute in some way to the energy conversion process. In gas turbine engines, air discharged from a compressor section and fuel introduced from a fuel supply are mixed together and burned in a combustion section. The products of combustion are harnessed and directed through a turbine section, where they expand and turn a central rotor shaft. The rotor shaft may, in turn, be linked to devices such as an electric generator to produce electricity.

To increase efficiency, engines are typically operated near the operational limits of the engine components. For example, to maximize the amount of energy available for conversion into electricity, the products of combustion (also referred to as the working gas or working fluid) often exit the combustion section at high temperature. This elevated temperature generates a large amount of potential energy, but it also places a great deal of stress on the downstream fluid guide components, such as the blades and vanes of the turbine section.

In an effort to help components within the engine withstand these temperatures, a number of strategies have been developed. One strategy is to manufacture these components from advanced materials that can operate in high-temperature environments for extended periods. Another strategy includes protecting the components with special, heat-resistant coatings that lessen the effects of exposure to elevated temperatures. In still another strategy, the components may be cooled through a variety of methods. Each of these strategies has advantages and disadvantages, and the strategies may be combined to fit various situations and operating conditions.

In situations where turbine components are cooled, one cooling method involves delivering compressor-discharge air, or other relatively-cool fluid, to the exterior of the components. The cooling fluid may flow along the surface of the component, as in "film" cooling, or it may be guided to impinge upon the component surface. Cooling fluid may also be delivered to the interior of a component so that the component temperature may be reduced from the inside out.

Although cooling may be used to improve the high-temperature operation of blades and vanes, problems associated with this strategy limit its effectiveness in many situations. In situations where the cooling fluid is air provided by the compressor, extensive use of cooling may adversely affect engine performance by reducing the amount of air available for combustion and reducing power generating capacity of a given engine. Even in situations where cooling fluid is not provided by the compressor, it is difficult to ensure that all components are cooled sufficiently. Inadequate cooling can be troublesome, because in cases where portions of a component are not cooled sufficiently, the component may fail during operation.

While a variety of strategies have been developed to improve the high-temperature tolerance of turbine engine components, there are difficulties associated with these strategies. Additionally, as performance requirements increase, turbine components are subjected to even-more-extreme conditions. Accordingly, there remains a need in this field for strategies that allow turbine engine components to withstand extreme temperatures.

SUMMARY OF THE INVENTION

The present invention is a turbine engine flow guide component that provides improved tolerance to extreme operating temperatures. The guide component includes features that allow highly-efficient cooling and increased heat dissipation properties. The component includes an elongated body having an interior cavity that includes cooling fluid flowpath. First and second guided-flow regions in the flowpath are separated by a contoured boundary member. The first guided-flow region is substantially surrounded by the boundary member and adapted to produce a vortex of cooling fluid. The second guided-flow region is disposed between an end of the cavity and an outer surface of the boundary member. The first guided-flow region is adapted to cool a region surrounded by the boundary member, and the guided-flow region is adapted to cool the region disposed between the cavity and outer surface of the boundary member, thereby ensuring effective cooling of the component without requiring increased cooling flow volume or producing overcooled areas.

Other advantages of this invention will become apparent from the following description taken in conjunction with the accompanying drawings wherein are set forth, by way of illustration and example, certain embodiments of this invention. The drawings constitute part of this specification and include exemplary embodiments of the present invention and illustrate various objects and features thereof.

DETAILED DESCRIPTION OF THE INVENTION

Figure 1:
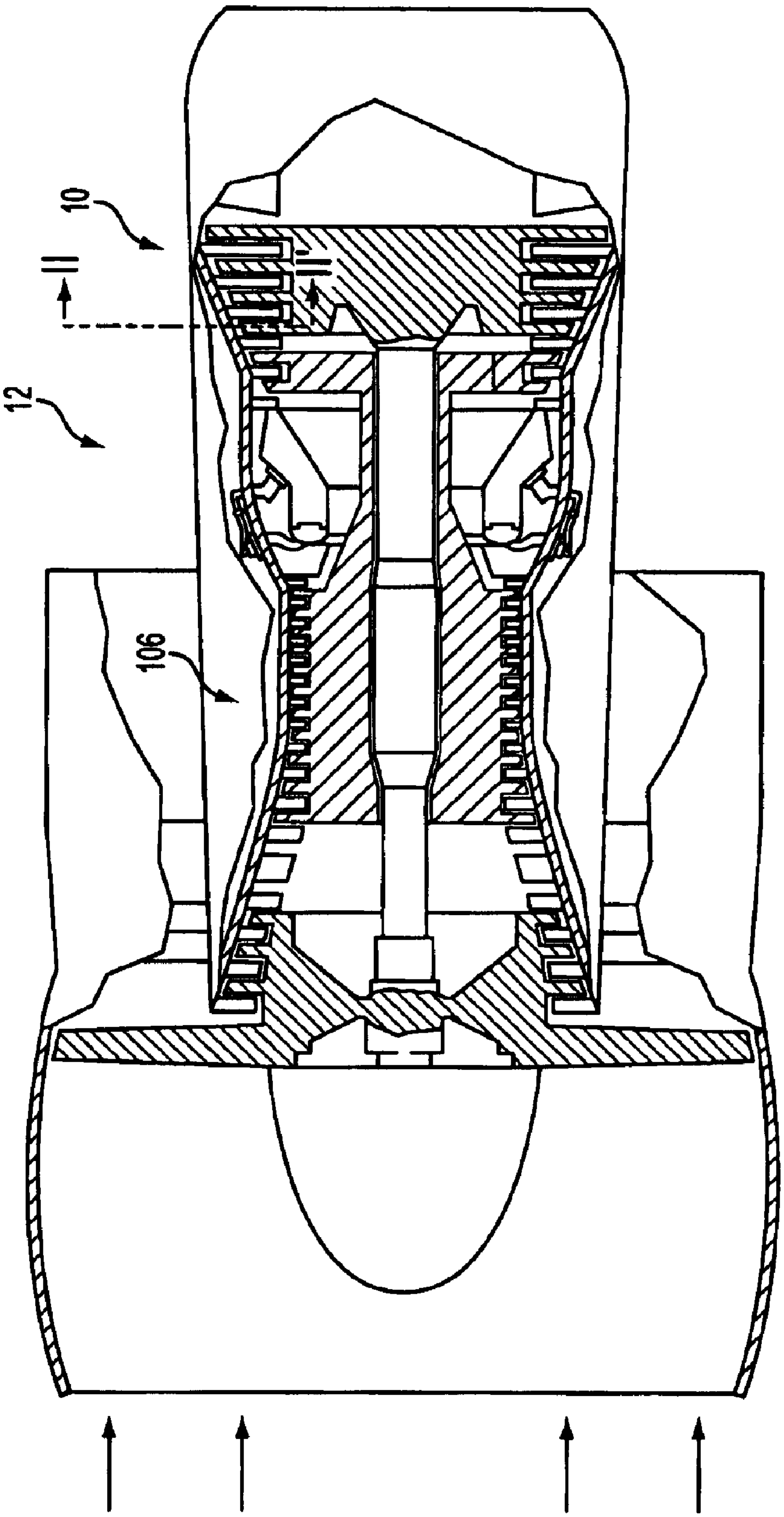
FIG. 1 is a side plan view of an engine using the fluid guide component of the present invention.

Reference is made to the Figures, generally, in which a fluid guide component 10 according to the present invention is shown. By way of overview, the guide component 10 includes elements that allow the component to provide enhanced temperature reduction without reducing engine performance. In one aspect of the invention, the fluid guide component 10 includes an interior cavity 18 having features that increase heat dissipation without relying on an increased volume of cooling fluid flow. In another aspect of the invention, the guide component 10 includes guided-flow regions 28,30 that strategically direct cooling fluid 20 through the component interior cavity 18, thereby ensuring key areas of the component 10 are cooled appropriately. In yet another aspect of the invention, the fluid guide component 10 includes structure that ensures effective cooling of an interior cavity turning zone 48 without producing overcooled regions within the component.

Figure 2:
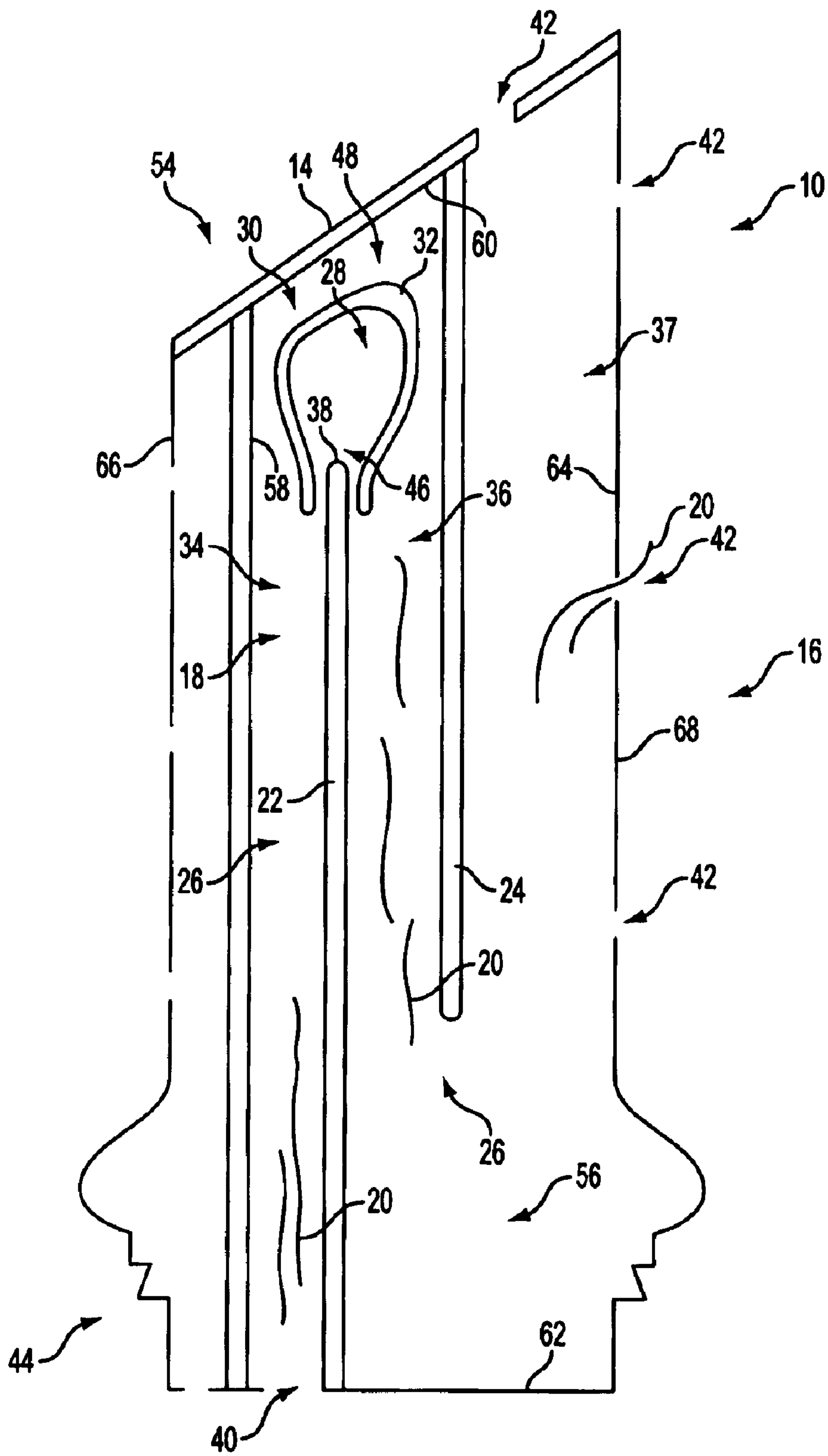
FIG. 2 is a cross-section end view of the fluid guide component shown in FIG. 1, taken along cutting plane II–II' therein.

With particular reference to FIGS. 1 and 2, a first embodiment of a fluid guide component 10 of the present invention will now be discussed. In this embodiment, the component 10 is an internally-cooled turbine blade for use in a combustion engine 12. Accordingly, the component 10 is characterized by an attachment end 44 spaced apart from an opposite blade tip end 54 by an elongated body portion 16. The elongated body portion 16 has an airfoil-shaped cross section with a leading edge 66 spaced apart from an opposite trailing edge 68 by substantially-continuous, opposing sidewalls 70,72. It is noted that the guide component 10 need not be a blade; other embodiments, including stationary vanes or other internally-cooled, fluid-directing elements may also be used and are contemplated by this invention.

Figure 4:
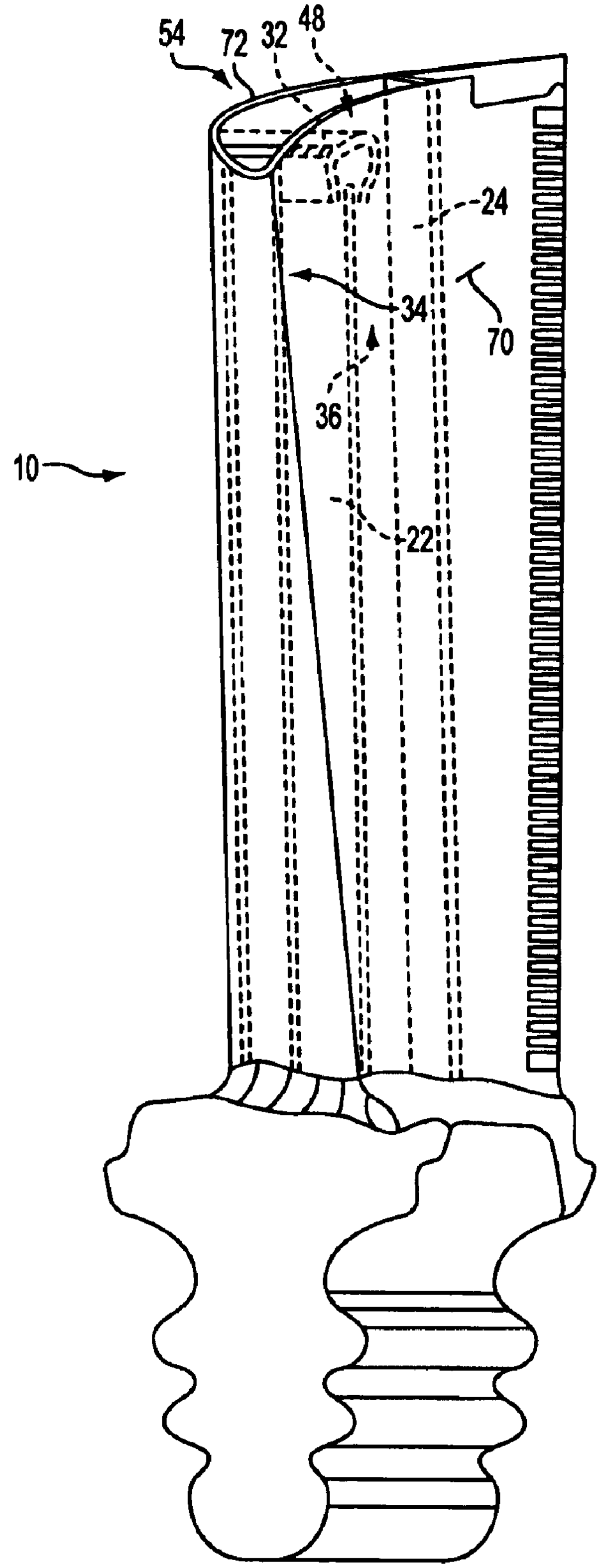
FIG. 4 is partial isometric view of the fluid guide component of the present invention.

With continued reference to FIG. 2, and with additional reference to FIG. 4, the body portion 16 of the fluid guide component 10 has an interior cavity 18 with partition members 22,24 disposed therein. The partition members 22,24 extend between the body portion sidewalls 70,72 and cooperate with boundary surfaces 58,60,62,64 of the interior cavity 18 to define a cooling fluid flowpath 26 characterized by three channels 34,36,37. First and second turning zones 48,56 located within the interior cavity 18 near the tip end 54 and attachment end 44, respectively, each fluidly link an associated pair 34,36 and 36,37 of cooling channels. During operation, cooling fluid 20 is directed through the flowpath 26 to remove heat from the component 10. At least one cooling fluid inlet 40 allows cooling fluid 20 to enter the interior cavity 18, and cooling fluid outlets 42 allow the cooling fluid to exit. Although FIG. 2 shows the attachment end 44 of the blade 10 as the cooling fluid inlet 40 location, cooling fluid 20 may enter the interior cavity 18 from other locations if desired.

Figure 3:
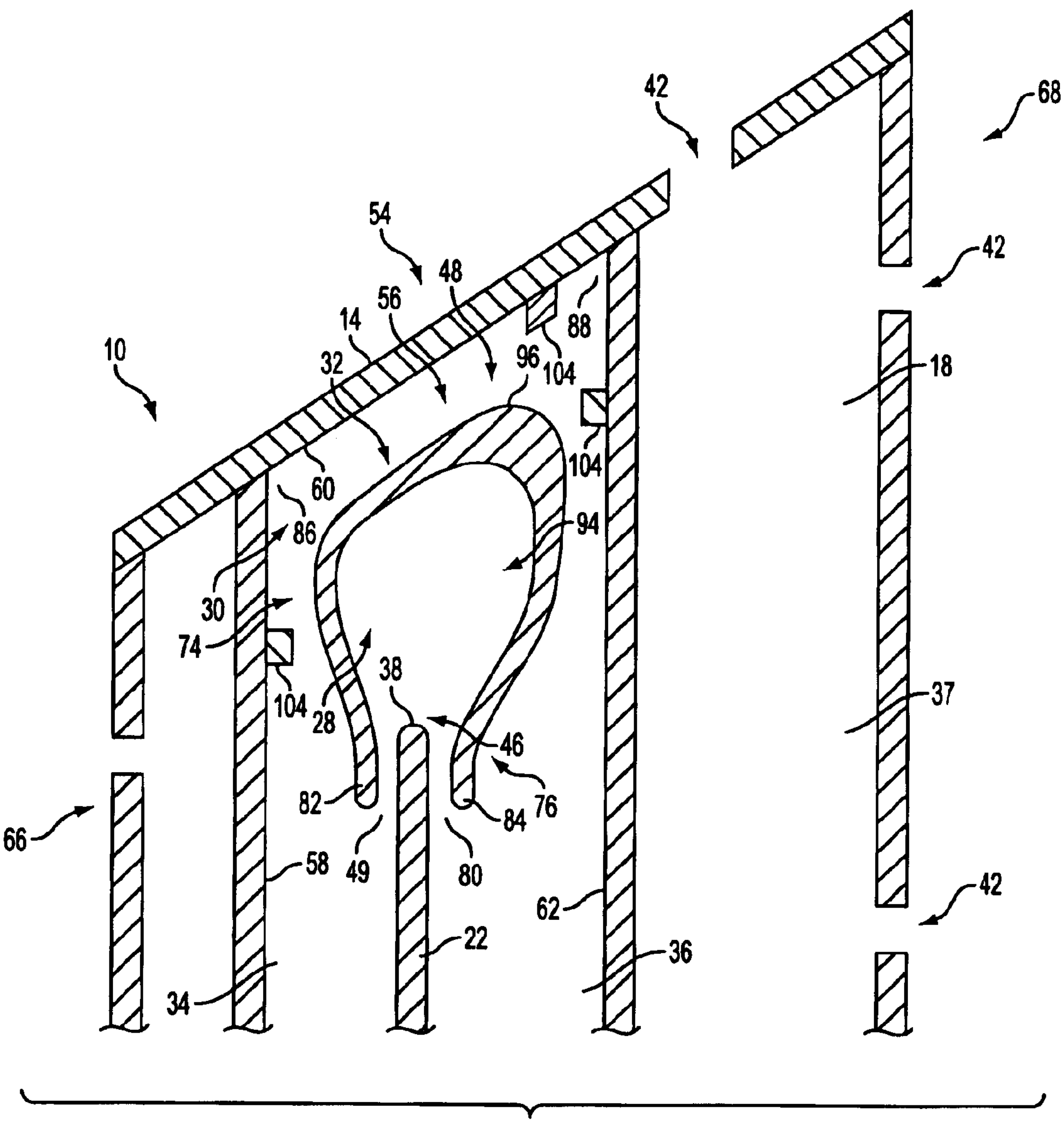
FIG. 3 is close up view of the image shown in FIG. 2

With reference to FIGS. 2 and 3, the first turning zone 48 will now be described. As noted above, the first and second channels 34,36 are fluidly linked by a first turning zone 48, and a contoured boundary member 32 divides the first turning zone into two guided-flow regions 28,30. These guided-flow regions 28,30 cooperatively ensure that the first turning zone 48 is cooled appropriately. More particularly, as seen with reference to FIGS. 3 and 5, each region 28,30 directs a portion 50,52 of cooling fluid through a key area of the first turning zone 48: a first portion 50 of cooling fluid 20 flows through the first guided-flow region 28 to reduce the temperature of the area adjacent the first partition member free end 38, and a second portion 52 of cooling fluid flows through the second guided-flow region 30 to reduce the temperature of the area between the contoured boundary member 32 and the cavity boundary surfaces 58,60,62 located at the tip end 54 of the component 10. As will be described more fully below, this dual guided-flow region arrangement advantageously ensures that the tip end 54 of the fluid guide component 10 is cooled as needed, without producing overcooled regions.

Now, with particular reference to FIGS. 3 and 4, a first embodiment of the contoured boundary member 32 will be described in detail. In this embodiment, the contoured boundary member 32 is an elongated component that extends between the body portion sidewalls 70,72. With continued reference to FIG. 4, the contoured boundary member 32 is a substantially-tubular structure with a cross section that resembles a horseshoe, including a rounded head portion 74 and a tapered shoulder portion 76. The head portion 74 provides a swirl-inducing region 94 which has a substantially-circular cross section characterized by a defining dimension $D_{si}$; the shoulder portion 76 defines a longitudinally-extending flowthrough passageway 46 characterized by a first lip 82 disposed within the first channel 34 and a second lip 84 disposed within the second channel 36.

Figure 5:
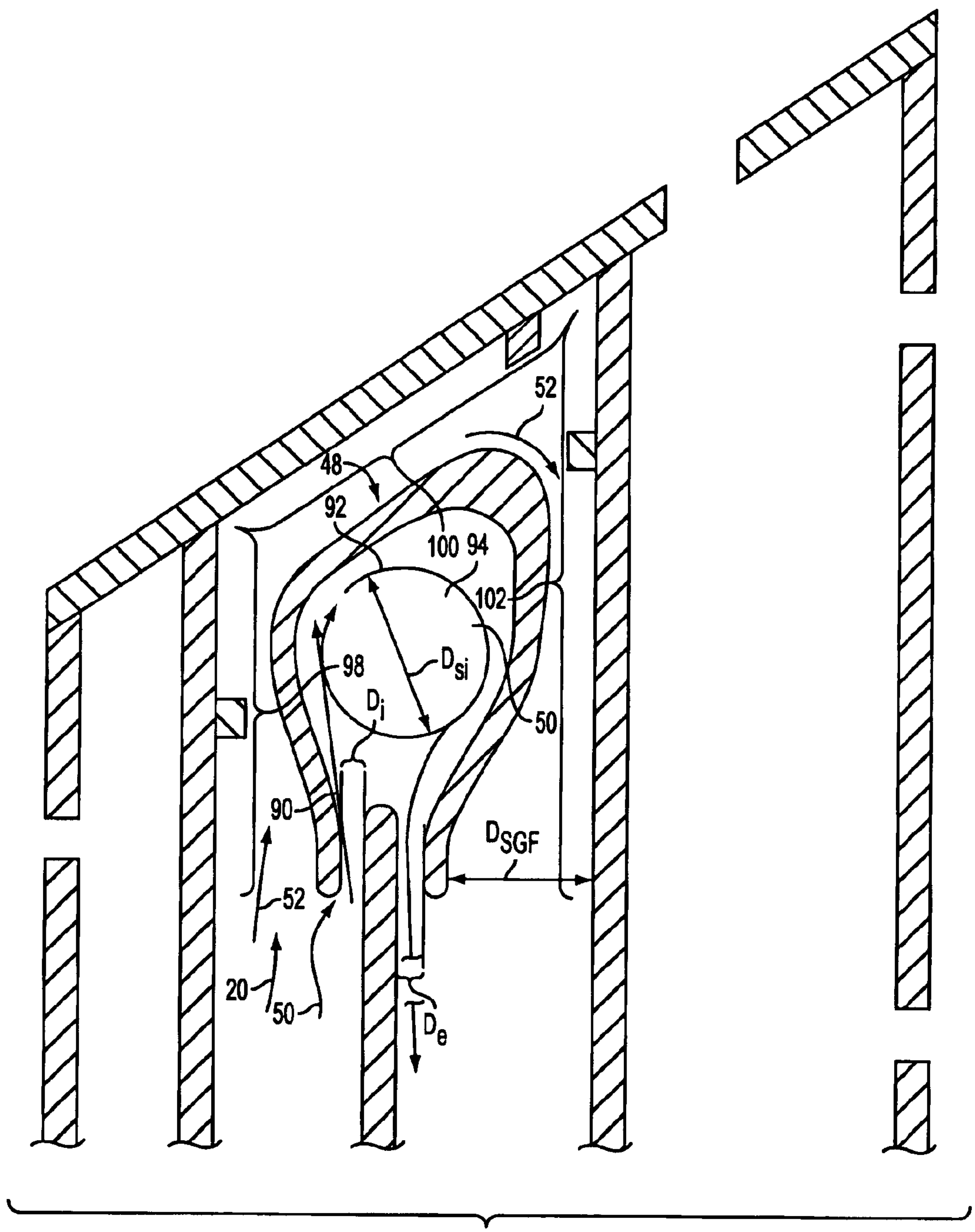
FIG. 5 is an alternate close up view of the image shown in FIG. 2, showing fluid flow.

As seen in FIGS. 3, 4 and 5, the first partition member 22 divides the flowthrough passageway 46 into an entrance region 49 and an exit region 80. The shoulder region first lip 82 and first partition member 22 are spaced apart by a distance $D_i$, and the shoulder region second lip 84 is spaced apart from the first partition member by a distance of $D_e$. It is also noted that the first partition member free end 54 need not be centered within the flowthrough passage 46: the values of $D_i$ need not be equal $D_e$. In this embodiment, the ratio of $D_i$ to $D_e$ is about two. The entrance region 49 provides a metering slot through which the first portion 50 of cooling fluid enters the head portion 74, and the exit region allows cooling fluid to travel out of the head region and into the second channel 36, downstream of the first turning zone 48. The entrance and exit regions 49,80, along with the swirl-inducing region 94 form the first guided-flow region 28. These three regions 49,80,94 are fluidly linked and, as will be described more fully below, cooperatively form a cyclone or vortex of cooling fluid 50 within the swirl-inducing region that advantageously cools the region adjacent the first partition member free end 38. It is noted that the vortex flow pattern produced in the swirl-inducing region 94 increases the heat dissipation properties for the first portion 50 of cooling fluid passing adjacent the first partition member free end 38.

With continued reference to FIG. 3, and with additional reference to FIGS. 4 and 5, as the first the first lip 82 and first partition free end 38 cooperatively direct the first portion 50 of cooling fluid along a path which is substantially-tangential to the vortex maintained by the contoured boundaries of the swirl-inducing region 94. The interaction of fluid passing leaving the fluid entrance region 49 and entering the swirl-inducing region 94 creates a jet and contributes to the vortex flow established in the swirl-inducing region. Although the dimensions $D_{si}$ and $D_i$ may be scaled to accommodate fluid guide components 10 of various sizes, it is preferable that the ratio of $D_{si}$ to $D_i$ be within the range of about 10 to about 15. It is noted that while described as resembling a horseshoe, the contoured boundary member 32 may have a variety of cross-section profiles, including substantially C-shaped or U-shaped; essentially any cross section which forms a vortex or induces swirled flow within the first guided-flow region effective to reduce the temperature of the area adjacent the first partition member free end 38 would suffice and is contemplated by the present invention.

The second guided-flow region 30 will now be described in detail. As seen with in FIGS. 3 and 5, the second guided-flow region 30 extends between the outer surface 96 of the contoured boundary member 32 and the first, second, and third boundary surfaces 58,60,62 of the interior cavity 18. The relative spacing between the boundary surfaces 58,60,62 and the adjacent portion of the contoured boundary member outer surface 96 varies with position along the second guided-flow region 30. The second guided-flow region 30 comprises a first leg 98, a second leg 100, and a third leg 102; the legs are in fluid communication.

With cooperative reference to FIGS. 3 and 5, the first leg or section 98 spans flow-wise between the contoured boundary member first lip 82 and a first cavity tip end corner 86. The second leg or section 100 spans flow-wise between the first cavity tip end corner 86 and a second cavity tip end corner 88. The third leg or section 102 spans flow-wise between the second cavity tip end corner 88 and the contoured boundary member second lip 84. As noted above, The distance $D_{sgf}$ between the contoured boundary member outer surface 96 and associated cavity boundary surface 58,60,62 varies with position along the second guided-flow region 30 and is strategically selected to impart desired flow characteristics to the second portion of cooling fluid 52 at key locations of the component 10. For example, the second guided-flow region 30 is relatively-narrow near the cavity tip end corners 86,88, while remaining relatively broad near the first lip 82 and second lip 84.

With this arrangement, the second portion of cooling fluid 52 accelerates as it travels along the first leg 98 toward the first cavity tip corner 86, changes direction and continues accelerating along the second leg 100 toward the second cavity tip corner 88, changes direction once again and continues with decreasing velocity along the third leg 102 to head toward the second channel 36. In keeping with various aspects of the present invention, the second portion of cooling fluid 52 provides impingement cooling of the cavity tip corners 86,88, as well as internal cooling of tip wall 14. It is noted that the acceleration and directional changes produces along this second guided-flow region 30 enhance the heat dissipation capabilities of the second portion of cooling fluid. It is also noted that turbulence-increasing structures 104, often referred to as "trip strips" or turbulators, may be used to further augment the heat transfer properties of cooling fluid if desired.

During operation of an engine 12 in which the fluid guide component of the present invention is installed, cooling fluid 20 travels from a cooling fluid source, such as a compressor 106 (shown in FIG. 1), pump or other suitable source, and enters the component interior cavity 18 via at least one cavity inlet 40. The cooling fluid 18 enters the first channel 34 and begins to travel along the cooling fluid flowpath 46 described above. With continued operation, cooling fluid 20 travelling within the first channel 34 enters the first turning zone 48 and encounters the contoured boundary member first lip 82, which splits the cooling fluid 20 into a first portion 50 and a second portion 52.

The behavior, path, and purpose of each portion 50,52 of cooling fluid is different and strategically selected to provide appropriate cooling to the guided-flow regions 28,30. With reference to FIGS. 3 and 5, the first portion 50 of cooling fluid travels into the first guided-flow region 28, and the second portion travels into the second guided-flow region 30. As noted above, the first guided-flow region 28 cools the region adjacent the first partition member free end 38, while the second guided-flow region 30 cools the cavity tip corners 86,88 and the tip wall 14. Additionally, the exit region 80 of the first guided-flow path advantageously cooperates with the third leg 102 of the second guided-flow path 30 to ensure that flow separation tendencies are reduced as the first and second portions 50,52 of cooling fluid rejoin when leaving the first turning zone 48 to enter the second channel 36 and continue through the downstream remainder of the flowpath 26. After travelling through the cooling fluid flowpath 26, the cooling fluid 20 exits the component cavity 18 through a cavity outlet 42. With this arrangement, cooling fluid 20 travelling through within the internal cavity strategically cools the first turning zone 48 without an increased amount of cooling fluid volume or producing overcooled locations.

It is noted that the volume $V_1$ of the first portion 50 of cooling fluid flowing through the first guided-flow region 28 and the volume $V_2$ of the second portion 52 of cooling fluid flowing through the second guided-flow region 30 need not be equal. One particularly-effective ratio of $V_2$ to $V_1$ is within the range of about one to about four; that is, where volumetric flow in the second guided flow region 30 is up to about four times as much as the volumetric flow in the first guided flow region 28. It is also noted the cross sectional areas of the various regions have particularly-effective relationships in the present embodiment. For example, the ratio of cross-sectional area at the first cavity tip end corner 86 to the cross-sectional area at the beginning of the first guided-flow region 30 is within the range of about 0.65 to about 0.45. The ratio of cross-sectional area at the second cavity tip end corner 88 to the cross-sectional area at the end of the first guided-flow region 30 is within the range of about 0.65 to about 0.45. The ratio of cross-sectional area within the second guided flow region second leg 100 to the cross-sectional area at the first cavity tip end corner 86 is within the range of about 0.65 to about 0.80.

It is to be understood that while certain forms of the invention have been illustrated and described, it is not to be limited to the specific forms or arrangement of parts herein described and shown. It will be apparent to those skilled in the art that various, including modifications, rearrangements and substitutions, may be made without departing from the scope of this invention and the invention is not to be considered limited to what is shown in the drawings and described in the specification. The scope if the invention is defined by the claims appended hereto.

What is claimed is:

1. An internally-cooled fluid directing component comprising:

an elongated body member having a first end and a second end;

an interior cavity disposed within said body member, said interior cavity having a cooling fluid inlet and a cooling fluid outlet;

a partition member disposed within said interior cavity and positioned to divide said interior cavity into a first channel and a second channel;

a turning zone disposed within interior cavity and fluidly linking said first and second channels;

at least one boundary member disposed within said turning zone, said at least one boundary member dividing said turning zone into a first guided-flow region and a second guided-flow region, with said boundary member being contoured to substantially surround said first guided-flow region; said boundary member including first and second ends with a head portion disposed therebetween, said first and second ends and said head portion being spaced apart from said partition member, with the distance between a free end of said partition member and an upper portion of said head portion being greater than the distance between said first end and said partition member and the distance between said second end and said partition member;

wherein said first channel, said turning zone, and second channel cooperatively form a flowthrough path adapted to transmit cooling fluid between said cooling fluid inlet and said cooling fluid outlet, whereby said first and second guided-flow regions are adapted to direct a first portion of cooling fluid through said first guided-flow region and a second portion of cooling fluid through said second guided-flow regions, respectively, thereby allowing strategic cooling of said turning zone.

2. The internally-cooled fluid directing component of claim 1, wherein said first guided-flow region is proximate a first end of said partition member and said second guided-flow region is proximate a tip wall of said interior cavity.

3. The internally-cooled fluid directing component of claim 1, wherein said first guided-flow region includes a swirl-inducing region defined by said contoured boundary member.

4. The internally-cooled fluid directing component of claim 3, wherein said swirl-inducing region is fluidly connected to said first channel by an entrance region and an exit region, said entrance region and said exit region, and said swirl-inducing region being sized and shaped to cooperatively direct said first portion of cooling fluid along a vortex-shaped flowpath.

5. The internally-cooled fluid directing component of claim 4, wherein said entrance region and exit region are spaced apart by said partition member.

6. The internally-cooled fluid directing component of claim 4, wherein said first guided-flow region is adapted to flow fluid a first flow rate and said second guided-flow region is adapted to flow fluid at a second flow rate, wherein the ratio of said first flow rate to said second flow rate is within the range of about 1 to about 4.

7. The internally-cooled fluid directing component of claim 4, wherein said entrance region is characterized by a first distance, and wherein swirl-inducing region is characterized by a second distance, and wherein the ratio of said second distance to said first distance is within the range of about 10 to about 15.

8. The internally-cooled fluid directing component of claim 1, wherein said first guided-flow region is proximate a first end of said partition member and said second guided-flow region is proximate a tip wall of said interior cavity.

9. The internally-cooled fluid directing component of claim 8, wherein second guided-flow region is disposed between said boundary member and said interior cavity.

10. The internally-cooled fluid directing component of claim 8, wherein second guided-flow region includes at least one tapered region adapted to provide accelerated flow adjacent a corner of said interior cavity.

11. The internally-cooled fluid directing component of claim 10, wherein second guided-flow region includes turbulence increasing elements.

12. The internally-cooled fluid directing component of claim 1, wherein second guided-flow region further includes at least one tapered region adapted to provide accelerated flow adjacent a corner of said cavity.

13. The internally-cooled fluid directing component of claim 1, wherein said body member is characterized by an airfoil-shaped cross section including a leading edge spaced apart from a trailing edge by a first sidewall and an opposite second sidewall.

14. The internally-cooled fluid directing component of claim 1, wherein said boundary member extends flow-wise within said turning zone.

15. An internally-cooled fluid directing component, comprising:

an elongated body having an interior cavity disposed therein, said interior cavity including a cooling fluid flowpath;

a first guided-flow region disposed within said flowpath and a second guided-flow region disposed within said flowpath, said guided-flow regions being separated by a contoured boundary member disposed therebetween;

said first guided-flow region being substantially surrounded by said boundary member, and said second guided-flow region being disposed between an end of said cavity and an outer surface of said boundary member;

said first guided-flow region being adapted to produce a vortex, whereby said first guided-flow region is adapted to cool a region surrounded by said boundary member, and said second guided-flow region is adapted to cool a region disposed between an end of said cavity and an outer surface of said boundary member.

16. The internally-cooled fluid directing component of claim 15, further including a partition member in said interior cavity to form a first channel and a second channel, said first and second channels being fluidly linked via a turning zone disposed proximate an end of said interior cavity, said channels and said turning zone being disposed within said flowpath.

17. The internally-cooled fluid directing component of claim 16, wherein said boundary member in said turning zone and said first guided-flow region and a second guided-flow region comprise said turning zone.

18. A method of internally cooling a guide member comprising the steps of:

providing an internally-cooled fluid guide component having an elongated body with an interior cavity disposed therein, said interior cavity including a cooling fluid inlet and a cooling fluid outlet, said cooling fluid inlets and outlet being fluidly linked by a flowpath extending therebetween;

disposing a partition member in said interior cavity to form a first channel and a second channel, said first and second channels being fluidly linked via a turning zone disposed proximate an end of said interior cavity, said channels and said turning zone being disposed within said flowpath;

disposing a boundary member in said turning zone, said boundary member dividing said turning zone into a first guided-flow region and a second guided-flow region, said boundary member being contoured to substantially surround said first guided-flow region, said boundary member including first and second ends with a head portion disposed therebetween, said first and second ends and said head portion being spaced apart from said partition member, with the distance between a free end of said partition member and an upper portion of said head portion being greater than the distance between said first end and said partition member and the distance between said second end and said partition member;

attaching a source of cooling fluid to said cooling fluid inlet;

flowing cooling fluid through said cooling fluid inlet to said exit through said flowpath, whereby cooling fluid flowing through said first guided region cools a region proximate said partition member and cooling fluid flowing through said second guided flow region cools a region disposed between said boundary member and said end of said cavity.

19. A method of internally cooling a guide member comprising the steps of:

providing an internally-cooled fluid guide component having an elongated body with an interior cavity disposed therein, said interior cavity including a cooling fluid inlet and a cooling fluid outlet, said cooling fluid inlets and outlet being fluidly linked by a flowpath extending therebetween;

disposing a partition member in said interior cavity to form a first channel and a second channel, said first and second channels being fluidly linked via a turning zone disposed proximate an end of said interior cavity, said channels and said turning zone being disposed within said flowpath;

disposing a boundary member in said turning zone, said boundary member dividing said turning zone into a first guided-flow region and a second guided-flow region, said boundary member being contoured to substantially surround said first guided-flow region, wherein said first guided flow region includes a swirl-inducing region adapted to produce a vortex of cooling fluid within said first guided-flow regions;

attaching a source of cooling fluid to said cooling fluid inlet;

flowing cooling fluid through said cooling fluid inlet to said exit through said flowpath, whereby cooling fluid flowing through said first guided region cools a region proximate said partition member and cooling fluid flowing through said second guided flow region cools a region disposed between said boundary member and said end of said cavity.

* * * * *